United States Patent [19]

Chuang et al.

[11] Patent Number: 5,162,417
[45] Date of Patent: Nov. 10, 1992

[54] GELLED ACIDIZER COMPOSITION

[75] Inventors: Jui-Chang Chuang, Wayne; Jenn S. Shih, Paramus, both of N.J.; Joseph Niu, Singapore, Singapore

[73] Assignee: ISP Investments Inc., Wilmington, Del.

[21] Appl. No.: 677,904

[22] Filed: Apr. 1, 1991

[51] Int. Cl.$^5$ .......................... C08K 3/00; C08L 39/06
[52] U.S. Cl. ....................................... 524/401; 524/548
[58] Field of Search ................. 524/401, 548; 526/264

[56] References Cited

U.S. PATENT DOCUMENTS 4,873,299 10/1989 Nowakowsky et al. ............ 526/264

*Primary Examiner*—Joseph L. Schofer
*Assistant Examiner*—Jeffrey T. Smith
*Attorney, Agent, or Firm*—Walter Katz; Marilyn J. Maue; Joshua J. Ward

[57] ABSTRACT

What is provided herein is a gelled acidizer composition which comprises an aqueous acid solution and a gelling agent therein which is a strongly swellable, moderately crosslinked polyvinylpyrrolidone polymers in the form of fine, white powders characterized by (a) an aqueous swelling parameter defined by its gel volume of about 15 to 150 ml/g of polymer and (b) a Brookfield viscosity in 5% aqueous solution of at least about 10,000 cps.

7 Claims, No Drawings

GELLED ACIDIZER COMPOSITION

CROSS-REFERENCE TO RELATED PATENT APPLICATIONS

BACKGROUND OF THE INVENTION

1. Field of the Invention

This application is related to copending U.S. Pat. application Ser. No. 599,592, filed Oct. 18, 1990, now U.S. Pat. No. 5,073,614 and assigned to the same assignee as herein.

This invention relates to gelled acidizer compositions, particularly for use in matrix or fracture acidizing operations to stimulate oil and gas wells, and even more particularly, to such compositions which contain strongly swellable, moderately crosslinked polyvinylpyrrolidone as the gelling agent therein.

2. Description of the Prior Art

Various polymers have been used as gelling agents for acids used to stimulate oil and gas wells with bottom hole temperatures ranging from 100° to 300° F. The complete spectrum of hydrochloric acid concentrations (1-28%) have been gelled for matrix or fracture acidizing treatments in limestone, dolomite, or other calcareous formations. However, it is necessary, and often lacking, in such acid gelling agents, to maintain a stable, high viscosity for controlling acid fluid leak-off to the formation and retardation of the acid reaction rate with the acid-soluble formation. Furthermore, post-treatment stability in high concentrations of calcium ion is very important in the spent acid fluid. Polyacrylamide-based acid gelling agents fail in this respect because they produce formation-damaging precipitates. It is preferred, instead, that the gelling agent thin out with pad fluids or connate water to a lower viscosity and provide post-treatment clean-up of formation fines and silts which can cause formation damage and rapid production declines.

Accordingly, it is an object of the present invention to provide a novel gelled acidizer composition.

Another object of the invention is to provide a novel gelled acidizer composition useful in matrix or fracture acidizing operations to stimulate oil and gas wells.

Still another object is to provide such compositions which are useful over a wide acid concentration range, and wide temperature range, and which provides a high viscosity at relatively low concentrations of the gelling agent.

These and other objects and features of the present invention will be made apparent from the following more particular description of the invention.

SUMMARY OF THE INVENTION

What is provided herein is a gelled acidizer composition which comprises an aqueous acid solution and a gelling agent therein which is a strongly swellable, moderately crosslinked polyvinylpyrrolidone (PVP) polymers in the form of fine, white powders characterized by (a) an aqueous swelling parameter defined by its gel volume of about 15 to 150 ml/g of polymer and (b) a Brookfield viscosity in 5% aqueous solution of at least about 10,000 cps. This polymer preferably is prepared by precipitation polymerization in an organic solvent, in the presence of about 0.2 to 1% by weight of vinylpyrrolidone (VP) of a multifunctional crosslinking agent, preferably about 0.25 to 0.8% and optionally, about 0.35 to 0.6%. In the preferred forms of the invention, the polymer has an aqueous gel volume of about 25 to 75 ml/g, most preferably about 30 to 60 ml/g of polymer, a viscosity of at least 15,000 cps, most preferably 20,000 to 50,000 cps.

The gelled acidizer composition of the invention finds advantageous use in matrix or fracture acidizing operations to stimulate oil and gas wells. In such use, the aqueous gelled acid composition includes about 1-36% by weight of hydrochloric acid and about 1-10% by weight of the strongly swellable, moderately crosslinked polyvinylpyrrolidone polymer described above. The composition itself is characterized by having a Gardner viscosity of at least 400 cps, preferably at least 2,000 cps, and most preferably at least 4,000 cps. Generally the viscosity is in the range of about 2,000 to 50,000 cps depending upon the concentration of the polymer, preferably about 5,000 to 40,000, and most preferably, about 10,000 to 20,000 cps.

The gelled acidizer compositions of the invention are characterized by the properties of maintenance of a stable viscosity over an extended period of time, even at high acid concentrations, and at the relatively high temperatures found in many oil and gas operations.

DETAILED DESCRIPTION OF THE INVENTION

PREPARATION AND PROPERTIES OF GELLING AGENT OF COMPOSITION

In accordance with the present invention, there is provided herein a gelled acidizer composition which includes an aqueous acid solution which is thickened by a viscous, strongly swellable, moderately crosslinked polyvinylpyrrolidone polymer. This polymer is described in detail in the above referred to copending U.S. patent application. This application discloses the preparation of such desired polymers directly in the form of fine, white powders by precipitation polymerization of vinylpyrrolidone in the presence of a predetermined amount of a crosslinking agent and free radical polymerization initiator in an organic solvent, preferably an aliphatic hydrocarbon, e.g. a $C_3$–$C_{10}$ saturated, branched or unbranched, cyclic or acyclic aliphatic hydrocarbon, and most preferably cyclohexane or heptane, or mixtures thereof.

The amount of solvent used in the process of the invention should be sufficient to dissolve an appreciable amount of the reactants and to maintain the copolymer precipitate in a stirrable state at the end of the polymerization. Generally, about 10 to 50% solids, preferably 15-30%, is maintained in the reaction mixture.

The precipitation polymerization process of the invention is carried out in the presence of a suitable free radical polymerization initiator. Suitable initiators include acyl peroxides such as diacetyl peroxide, dibenzoyl peroxide and dilauryl peroxide; peresters such as t-butyl peroxypivalate, tert-butyl peroxy-2-ethylhexanoate; peroxides such as di-tert-butyl peroxide; percarbonates such as dicyclohexyl peroxydicarbonate; and azo compounds such as 2,2'-azobis(isobutyronitrile), 2,2'-azobis(2,4-dimethylvaleronitrile), 1,1'-azobis(cyanocyclohexane), and 2,2'-azobis(methylbutyronitrile). Other initiators known in the art also may be used. A preferred initiator is the following:

| Preferred Initiator | | |
| --- | --- | --- |
| t-Butyl peroxy- | Atochem N.A. | Liquid; 75% active |

| -continued | | |
|---|---|---|
| Preferred Initiator | | |
| pivalate | (Lupersol 11) | in mineral spirits |

The amount of such initiator may vary widely; generally about 0.2–5.0% is used, based on the weight of total monomers charged.

The reaction temperature may vary widely; generally the reaction mixture is maintained at about 40°–150° C., preferably 60°–70° C., during the polymerization. Pressure usually is kept at atmospheric pressure, although higher and lower pressures may be used as well.

The reaction mixture should be stirred vigorously under an inert atmosphere, e.g. nitrogen, during the polymerization. A stirring rate of about 100–600 rpm in a 1-liter lab reactor is quite adequate to effect the desired polymerization and to keep the precipitate in a stirrable state during the polymerization.

Suitable crosslinking agents for use in the invention include such multifunctional compounds as the divinyl ethers of an aliphatic diol, e.g. the divinyl ethers of 1,3-propanediol, 1,4-butanediol, 1,5-pentanediol, 1,6-hexanediol, 1,7-heptanediol, 1,8-octanediol, 1,9-nonanediol, 1,10-decanediol, 1,11-unidecanediol, and 1,12-dodecanediol; as well as the divinyl ethers of diethylene glycol, triethylene glycol, tetraethylene glycol, pentaethylene glycol, hexaethylene glycol, heptaethylene glycol, octaethylene glycol, nonaethylene glycol, decaethylene glycol and further polyalkylene glycols up to a molecular weight of about 6000. Other suitable crosslinking agents include b 1,7-octadiene, 1,9-decadiene, 1,13-tetradecadiene, divinylbenzene, N-N'-divinylimidazolidone, and methylenebisacrylamide; acrylates such as polyethylene glycol diacrylate, trimethylolpropane triacrylate, propylene glycol diacrylate; allyl ether derivatives of polyhydric alcohols such as pentaerythritol triallyl ether; or polyhydric alcohols esterified once or twice with acrylic acid; triallylamine, tetraallylethylene- diamine, diallyl phthalate, and the like. Preferred crosslinking agents are the following: N,N'-divinylimidazolidone, pentaerythritol triallyl ether, triallyl-1,3,5-triazine-2,4,6(1H,3H,5H)-trione and 2,4,6-triallyloxy-1,3,5-triazine.

The precipitation polymerization process of the invention may be carried out by first precharging a suitable reactor with a predetermined amount of the organic solvent, for example, an aliphatic hydrocarbon solvent, and heating the solvent to a desired reaction temperature while stirring vigorously under an inert gas atmosphere. The initiator is then charged into the reactor. Then a solution containing selected amounts of vinylpyrrolidone monomer and the crosslinker material is admitted into the reactor over a period of time, generally about an hour or more, and preferably below the surface of the solvent. Then the reaction mixture is held for an additional period of time for polymerization to be completed. Finally, the mixture is cooled to room temperature. Filtering, washing with solvent, and drying provides the desired polymer in yields approaching quantitative. Alternatively, the reaction product may be dried directly to provide the polymer powders.

The heterogeneous polymerization process of the invention in cyclohexane or heptane solvent provides the desired PVP polymer product as a fine, white powder, which precipitates readily, in quantitative yield, with substantially the same degree of crosslinking as the charge of VP monomer and crosslinking agent, in a smooth polymerization without excessive swelling of polymer during the course of the process. More particularly, the solvents of the invention are non-solvents for PVP and enable the polymerization to proceed in the presence of crosslinking agent without excessive building up viscosity of the reaction mixture during polymerization.

Properties of Polymer of Invention

The strongly swellable, moderately crosslinked PVP polymer powders of the invention are characterized by its unique gel volume and viscosity, which properties enable the polymer to thicken aqueous and non-aqueous solutions effectively.

The viscosity of the polymer is defined by its Brookfield viscosity in cps, which is determined upon a 5% aqueous solution of the polymer at 25° C. by a standard analytical procedure using Model LTV and Spindle No. 4 at 12 rpm.

For maximum utility, it is desirable that the hydrated polymer exhibit a high gel volume and a high viscosity. With increasing crosslinking density in the polymer, the gel volume decreases and viscosity increases and then decreases, passing through a maximum. In the crosslinked polymer system of this invention, an effective thickener product is provided by including crosslinker in the reaction mixture at a suitable concentration of about 0.2 to 1.0 % by weight, based upon VP, preferably about 0.25 to 0.8%, and optimally, at about 0.35 to 0.6%. At this suitable amount of crosslinker loading, the crosslinked polymer product exhibits a gel volume of about 15 to 150 ml/g of polymer and a Brookfield viscosity of at least 10,000 cps. At the preferred crosslinker concentration, the gel volume is about 25 to 75 ml/g of polymer and its Brookfield viscosity is at least 5,000 cps. At the optimal amount crosslinker present in the reaction mixture, the polymer exhibits a gel volume of about 30 to 60 ml/g of polymer and a Brookfield viscosity of about 20,000 to 50,000 cps.

The viscosity of the crosslinked polymer of the invention is particularly substantially independent of extended storage time even at 50° C., and of pH, and is tolerant of monovalent and multivalent salts in solution.

As an added feature of the invention, the residual VP monomer content of the polymers obtained herein is less than about 0.1% by weight. In aqueous based processes, in contrast, the formation of a gel mass during polymerization may trap considerable amounts of VP monomer in the polymeric gel network.

The invention will be illustrated by reference to the following examples, which are given in parts by weight unless otherwise specified.

EXAMPLE 1

A 2-liter, 4-necked reaction vessel was equipped with a condenser, a constant speed mechanical stirrer, set at 170 rpm with a torque indicator and an anchor agitator having an open radius of 4 and 5/6 inches, an adaptor for admitting nitrogen, and a thermocouple connected to a temperature controller. The vessel was charged with 1000 g. of cyclohexane and heated to 65° C. during 30 minutes while purging with nitrogen. The reactor then was held at 65° C. for an additional 30 minutes. Then 520 microliters of t-butyl peroxypivalate (Lupersol 11, 75% active) polymerization initiator was added. Thereafter a solution of 250 g. of vinylpyrrolidone and 1.25 g. of N,N'-divinylimidazolidone crosslinking agent was introduced into the charged reactor over a period of 4 hours while stirring the contents. The feeding rate was about 1.0 ml./min. Then the mixture was heated to 85° C. over a half-hour and held at that temperature for another half-hour. Then the mixture was transferred to a 2-liter high pressure reactor and 1.0 g. of 2,5-dimethyl-2,6-di-(t-butylperoxy)hexane (Lupersol 101, 90% active) was added. The reactor was sealed and heated to 130° C. for 8 hours, cooled to room temperature, and the mixture was dried in a rotary evaporator. The polymer product was oven dried at 100° C. and vacuum dried at 90° C. for 16 hours of each. A quantitative yield of a crosslinked PVP polymer containing about 0.5% crosslinking agent was obtained.

EXAMPLES 2-10

The procedure of Example 1 was followed using various amounts of different crosslinkers with the following results.

TABLE I

| Ex. No. | VP, Amount (g) | Crosslinker* | Crosslinker, Amount (g) | % Crosslinker | **Product Yield (%) |
|---|---|---|---|---|---|
| 2 | 250 | DI | 0.25 | 0.10 | 96.0 |
| 3 | 250 | DI | 0.625 | 0.25 | 100.0 |
| 4 | 250 | DI | 2.5 | 1.00 | 100.0 |
| 5 | 250 | PTE | 0.25 | 0.10 | 93.0 |
| 6 | 250 | PTE | 0.625 | 0.25 | 92.0 |
| 7 | 250 | PTE | 2.5 | 1.00 | 94.2 |
| 8 | 250 | MBA | 0.625 | 0.25 | 87.0 |
| 9 | 250 | MBA | 1.25 | 0.50 | 96.0 |
| 10 | 250 | MBA | 2.5 | 1.00 | 100.0 |

*DI = divinylimidazolidone, PTE = pentaerythritol triallyl ether and MBA = methylenebisacrylamide
**based upon VP used, by weight

EXAMPLES 11-13

The procedure of Example 1 was followed using heptane as solvent in place of cyclohexane. The feeding rate of the solution of vinylpyrrolidone in crosslinking agent was 0.50-0.55 ml./min. The results are shown in Table II below.

TABLE II

| Ex. No. | VP, Amount (g) | Crosslinker | Amount (g) | % Crosslinker | Product Yield (%) |
|---|---|---|---|---|---|
| 11 | 200 | DI | 1.0 | 0.50 | 95.6 |
| 12 | 250 | PTE | 1.25 | 0.50 | 91.5 |
| 13 | 200 | TATT | 1.0 | 0.50 | 95.0 |

DI-Divinylimidazolidone
PTE-Pentaerythritol triallylether
TATT-Triallyl-1,3,5-triazine-2,4,6(1H,3H,5H)-trione

EXAMPLE 14

The reactor of Example 1 was provided with the anchor agitator positioned in the middle of the reactor and extended to within 2 inches of the bottom of the reactor. A dip tube was connected to two metering pumps. The thus-equipped reactor then was charged with the solvent which filled the reactor to about 4 inches above the bottom of the dip tubes. In this procedure, the solution of VP and crosslinking agent was admitted into the reactor through the dip tubes to a position below the surface of the solvent. The effect of such subsurface feeding of monomer-crosslinker solution was to reduce build-up of viscosity of the polymer product during the polymerization, resulting in a smoother course for the process, particularly with respect to effective stirring of the reaction mixture.

The constitution and properties of the gelled acidizer composition of the invention are summarized in Table III below.

TABLE III

CONSTITUTION AND PROPERTIES OF GELLED ACIDIZER COMPOSITION OF INVENTION

| | Concentration, % by Wt | | |
|---|---|---|---|
| | Suitable | Preferred | Optimum |
| Component | | | |
| Polymer of Exs 1-13 | 1-10 | 2-5 | 3 |
| Acid, e.g. HCl | 1-36 | 14-30 | 20-28 |
| Properties | | | |
| Viscosity, cps | 400-50,000 | 4,000-40,000 | 10,000-20,000 |

Typical formulations of the above compositions were prepared as follows, as shown in Table IV below.

TABLE IV

| Ex. No. | Component | Concentration % Polymer | Concentration % Acid | Gardner Viscosity* (Initial) | Gardner Viscosity* (Aged)** |
|---|---|---|---|---|---|
| 15 | Polymer of Ex. 11 HCl | 2.5 | 15.0 | 627 | 884 |
| 16 | Polymer of Ex. 12 H3PO4 | 1.0 | 86.0 | 470 | 470 |
| 17 | Polymer of Ex. 13 HCl | 2.5 | 28 | 4325 | 4325 |

*cps
**24 hours at 100° C.

As shown in Table IV, aqueous acid compositions containing three different crosslinked PVP thickeners were evaluated for acid stability at various temperatures for 24 hours. The thickeners are based on three different crosslinking agents, pentaerythritol triallyl ether (PTE), divinylimidazolidone (DI), and triallyl-1,3,5-triazine-2,4,6(1H,3H,5H)-trione (TATT).

The results show effective acid stability at high temperatures for each of these compositions over a prolonged period of time. Three commercial products, hydroxyethyl cellulose (HEC), and polyacrylamide, and a polyvinylpyroolidone/polyacrylamide (50/50 wt. %) copolymer also were tested as above. The criteria of acid stability of these products was determined by change in viscosity after 24 hours aging at 100° C. HEC was unstable overnight, even at room temperature. Precipitation and viscosity lowering were observed with polyacrylamide-thickened HCl indicating the formation of polyacrylic acid which is insoluble in HCl. Similar results, but to a lesser extent, were observed with polyvinylpyrrolidone/polyacrylamide (50/50 wt. ratio) copolymer.

The acid stability of the compositions of Examples 15-17 was also determined under commercial oil well test conditions. Each of the test samples was subjected to 350° F. for 4 hours in 28% HCl which represents a most severe condition on a polymer system. All samples showed no loss in viscosity after cooling. This result represents a most stable polymer system as compared to other commercial products. The test samples showed a slight thickening on standing. The salt tolerance of the compositions also was excellent. For example, in accordance with this observation, a test sample was used to gel 10 lb/gal NaCl brine and 11.6 lb/gal $CaCl_2$ brine solutions.

While the invention has been described with particular reference to certain embodiments thereof, it will be understood that changes and modifications may be made which are within the skill of the art. Accordingly, it is intended to be bound only by the following claims, in which:

What is claimed is:

1. A gelled acid composition which comprises:
   (a) an aqueous acid solution, and
   (b) a gelling agent therein which is a strongly swellable, moderately crosslinked PVP polymer in the form of fine, white powders characterized by (a) an aqueous gel volume of about 15 to 150 ml/g of polymer, (b) a Brookfield viscosity in 5% aqueous solution of at least about 10,000 cps, and (c) being prepared directly by precipitation polymerization of VP in the presence of a crosslinking agent in the amount of about 0.2 to about 1% by weight of VP.

2. A composition according to claim 1 in which the acid is HCl having a concentration of about 1–36% by weight.

3. A composition according to claim 1 wherein the gelling acid is present in a concentration of about 1–10% by weight.

4. A composition according to claim 1 having a Gardner viscosity of about 400 to 50,000 cps.

5. A composition according to claim 1 which is stable at temperature up to 400° F. for at least 4 hours.

6. A composition according to claim 1 wherein (a) is about 25 to 75 ml/g of polymer, (b) is at least about 15,000 cps, and (c) is about 0.25 to 0.8% by weight.

7. A composition according to claim 1 in which said PVP polymer is crosslinked with N,N'-divinylimidazolidone, pentaerythritol triallyl ether, triallyl-1,3,5-triazine-2,4,5(1H,3H,5H)-trione or 2,4,6-triallyloxy-1,3,5-triazine.

* * * * *